United States Patent
Dussel et al.

(10) Patent No.: US 8,770,366 B2
(45) Date of Patent: *Jul. 8, 2014

(54) FRICTION CLUTCH UNIT

(75) Inventors: Klaus Dussel, Karlsruhe (DE); Goetz Rathke, Pfaffenweiler (DE); Dirk Reimnitz, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 155 days.

This patent is subject to a terminal disclaimer.

(21) Appl. No.: 12/466,968

(22) Filed: May 15, 2009

(65) Prior Publication Data

US 2009/0218188 A1  Sep. 3, 2009

Related U.S. Application Data

(63) Continuation of application No. PCT/DE2007/001981, filed on Nov. 2, 2007.

(30) Foreign Application Priority Data

Nov. 17, 2006  (DE) .......................... 10 2006 054 624

(51) Int. Cl.
*F16D 13/75*  (2006.01)

(52) U.S. Cl.
USPC .............. 192/48.91; 192/70.252; 192/111.18; 192/111.19; 192/109 R (58) Field of Classification Search
USPC .................. 192/111.19, 111.4, 111.2, 111.18
See application file for complete search history.

(56) References Cited

U.S. PATENT DOCUMENTS

| | | | | |
|---|---|---|---|---|
| 5,186,298 A * | 2/1993 | Takeuchi | ................ | 192/111.16 |
| 5,450,934 A * | 9/1995 | Maucher | ................ | 192/70.252 |
| 5,727,666 A * | 3/1998 | Maucher | ................ | 192/70.252 |
| 5,984,067 A | 11/1999 | Weidinger | | |
| 6,634,477 B2 * | 10/2003 | Beneton et al. | ............. | 192/48.8 |
| 6,915,889 B2 * | 7/2005 | Weidinger et al. | ....... | 192/70.252 |
| 7,066,313 B2 * | 6/2006 | Kimmig et al. | .......... | 192/111.16 |
| 7,080,722 B2 * | 7/2006 | Vogt et al. | .................... | 192/48.8 |
| 2003/0079953 A1 * | 5/2003 | Carlson et al. | .............. | 192/48.8 |
| 2004/0222060 A1 | 11/2004 | Weidinger | | |

FOREIGN PATENT DOCUMENTS

| | | |
|---|---|---|
| DE | 4239289 | 5/1993 |
| DE | 4239291 | 5/1993 |
| DE | 4322677 | 1/1994 |
| DE | 43 42 390 Y | 6/1994 |
| DE | 4342390 | 6/1994 |
| DE | 4431641 | 3/1995 |
| DE | 19510905 | 10/1995 |
| DE | 19905373 | 8/2000 |
| DE | 10340665 | 3/2005 |

(Continued)

*Primary Examiner* — David D Le
*Assistant Examiner* — Ryan Dodd
(74) *Attorney, Agent, or Firm* — Davidson, Davidson & Kappel, LLC (57) ABSTRACT

A clutch unit which has a friction clutch, that includes a pressure plate, which is rotationally fixed to the housing, yet displaceable to a limited extent in the axial direction. The housing can be connected to a counter-pressure disk, and lever elements which are positioned in an annular arrangement and which are disposed between the housing and the pressure plate. The elements are supported on a rolling support carried by the housing and to which pressure can be applied at the radially inner lever tips thereof in order to close the friction clutch.

6 Claims, 7 Drawing Sheets

(56) References Cited

FOREIGN PATENT DOCUMENTS

| | | |
|---|---|---|
| DE | 102005037514 | 3/2006 |
| EP | 0992700 | 4/2000 |
| EP | 1452760 | 9/2004 |
| EP | 1 589 248 Y | 10/2005 |
| WO | 2007/000131 | 1/2007 |
| WO | 2007/000140 | 1/2007 |
| WO | 2007/000151 | 1/2007 |
| WO | 2007/062618 | 6/2007 |
| WO | 2008/025323 | 3/2008 |

* cited by examiner

Figure 1:
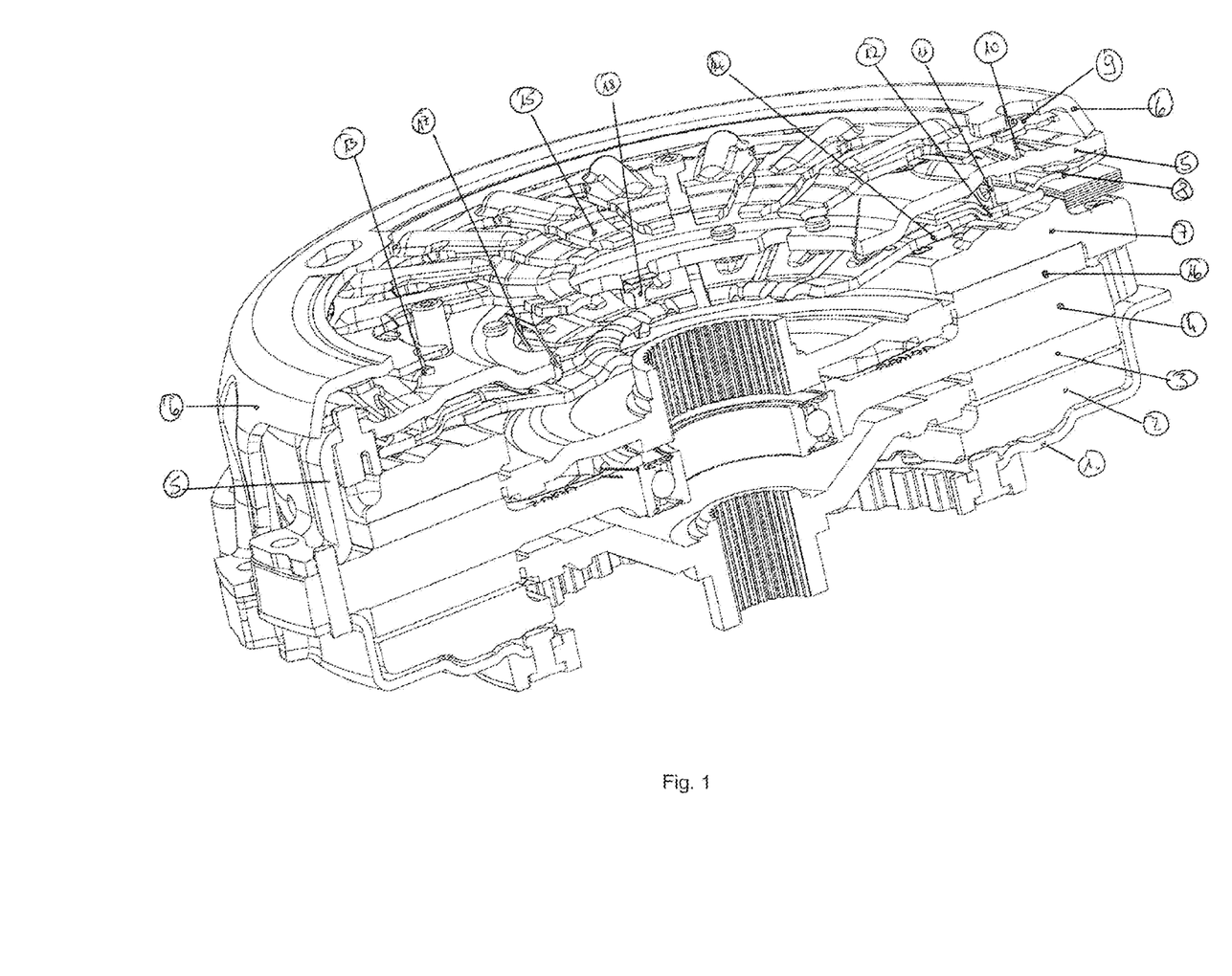

Fig. 6 too long ensures that they tend to adopt a frustoconical position which corresponds to the open state of the friction clutches 2 and 3.

The pressure plate 10 carries traction means 17 which extend axially and have at their end oriented away from the pressure plate 10 a pivot mounting or a rolling support 19 on which the lever spring 16 is supported tiltably or swivelably. In the exemplary embodiment illustrated the rolling support 19 is configured integrally with and carried by the traction means. or housing, .17 and is formed by an annular region oriented radially inwards.

The traction means 17 may be formed by individual hook-like components distributed around the circumference. Advantageously, however, these traction means 17 may be combined to form a component preferably produced from sheet metal which has a preferably closed annular region from which there may extend a plurality of axial arms which are rigidly connected to the pressure plate 10.

Radially inside the rolling support 19, the lever spring 16 is supported on an annular support ring 20. The annular support ring 20 is clamped axially between the housing-like component 12 and the lever spring 16 and forms a component of an adjustment device 21 by means of which at least the wear occurring on the friction linings 7 can be automatically compensated at least partially. In order to close the friction clutch 3 the radially inner tips 22 of the lever springs 16 are loaded in the direction towards the left. For this purpose there is provided an actuating element, for example an actuating bearing, which at least substantially applies the closing force to the friction clutch 3, which actuating element is not illustrated in detail. Such an actuating element is a component of an actuating system which may be configured as a pneumatically, hydraulically, electrically or mechanically actuated actuating system, or may have a combination of the actuating possibilities mentioned and is configured, for example, as an electrohydraulic actuating system.

Lever elements 13, 14 or lever springs 15, 16 have been proposed, for example, by DE 103 40 665 A1, DE 199 05 373 A1, EP 0 992 700 B1 and EP 1 452 760 A1.

The spring means, such as in particular leaf springs, which ensure torque transmission and the axial displaceability of the pressure plate 10, and which connect the components 8 and 10 to one another in known fashion, preferably have a defined axial pretension which ensures that the pressure plate 10 is loaded in the opening direction of the friction clutch 3. This means that in the exemplary embodiment illustrated, the pressure plate 10 is pressed away axially, in the direction towards the left, from the counter-pressure disk 8 by the pretensioned leaf springs mentioned. The friction linings 7 are thereby released. The pretension of the corresponding spring means, such as in particular leaf springs, must furthermore ensure that the rolling support 19 is always urged axially in the direction of the radially outer regions of the lever spring 16.

The support ring 20 forms a so-called adjusting ring 20 which is supported axially on the housing-like component 12 by means of a ramp system. The ramp system has ramps which are disposed in the circumferential direction and which rise in the axial direction. In known fashion, suitable ramps may be formed integrally on the adjusting ring 20, and the mating ramps cooperating therewith may advantageously be inserted directly in the region of the housing base of the housing-like component 12. In the circumferential direction, the adjusting ring 20 is loaded in the circumferential or adjusting direction by at least one spring (not shown in detail).

Details regarding the operation of an adjustment device, the possible configurations of ramps and mating ramps, and the design and arrangement of springs which enable adjustment within a ramp system, are apparent from DE 42 39 291 A1, DE 42 39 289 A1, DE 43 22 677 A1 and DE 44 31 641 A1.

The adjustment device 21 further includes a sensor device 23 which has a sensor ring 24 which, in a similar manner to that described in connection with the adjusting ring 20, is supported on the housing base of the housing-like component 12 by means of a ramp system and is loaded circumferentially in the adjusting direction by a spring. Here, the sensor ring 24 is arranged axially between the housing-like component 12 and the outer regions of the lever spring 16, radially at the level of the rolling support 19.

The sensor device 23 further has a sensor element 25, which preferably has axially resilient regions. If no wear has occurred, the sensor element 25 clamps the sensor ring 24 axially, so that the latter is then retained non-rotatably. The sensor element 25 has stop regions 26 which can cooperate with counter-stop regions 27 carried by the traction means, in particular when wear occurs on the friction linings 7. The axial arrangement of the stop regions 26 and the counter-stop regions 27, and the axial travel distances occurring between them upon actuation of the friction clutch 3, are co-coordinated with one another in such a way that, if the friction clutch 3 is closed and no wear is present, the stop regions 26 and the counter-stop regions 27 can at most touch one another. If wear is present, however, the stop regions 26 come into abutment against the counter-stop regions 27 before the complete closing travel or engagement travel of the friction dutch 3 has been covered. An axial displacement of the stop regions 26 in relation to at least the sensor ring 24 is thereby caused as a function of the wear which has occurred. This axial displacement causes the sensor ring to tend to be unloaded and therefore to be able to rotate by an angle which is dependent on the wear detected by the sensor element 25. The thereby occurring axial displacement of the sensor ring 24 with respect to the housing-like component is ensured by the ramp system 42 provided between the sensor ring 24 and this housing-like component.

As the friction clutch 3 is opened, that is disengaged, the lever spring 16 is forced back to an angular position in which the tips 22 of the lever spring 16 adopt an at least approximately constant axial position. Because of the wear-compensation effected by means of the sensor device 23, which in this case causes a corresponding axial displacement of the rolling support 19 towards the right, the support ring or adjusting ring 20 is unloaded as the friction clutch 3 is opened, so that said adjusting ring 20 is then also subjected to a rotation which, as a result of the ramp system present between the housing-like component 12 and the adjusting ring 20, causes a corresponding axial displacement of the adjusting ring 20. With regard to further details and functional features which may be advantageous in the configuration of the friction clutch 3, reference is made to the earlier application 10 2006 040 993.0 (WO 2008/025323).

The sensor element having the stop regions 26 may be formed by an annular component which, viewed circumferentially, has individual, preferably uniformly distributed fastenings to the housing-like component 12. The regions present between these fastenings of the annular sensor element 25 carry the stop regions 26. The regions of the sensor element 25 provided between the fastenings in the circumferential direction are deformable elastically or resiliently in the axial direction For some applications it may be advantageous if these regions are also exposed to a torsional loading which causes at least a slight twisting of at least the regions with smaller radial width extending circumferentially beside the stop regions 26.

The lever spring 15 of the friction clutch 2 is provided opposite the lever spring 16 on the other side axially of the radial regions of the housing-like component 12. The lever spring 16 is supported by a radially outer region on a support ring or adjusting ring 28, which indirectly carries the rolling support 19. In a manner similar to that described in connection with the adjusting ring 20, the adjusting ring 28 is rotatable with respect to the housing-like component 12 and is supported axially thereon via a ramp system 42. The adjusting ring 28 forms a component of an adjustment device 29 which is effective between the radial regions of the housing-like component 12 and the lever spring 15. Provided between the pressure plate 9 and the counter-pressure disk 8 and/or the housing-like component 12 are torque transmission means which are preferably formed by leaf springs, known per se, which are pretensioned axially in such a manner that the pressure plate 9 is pressed axially against the lever spring 15. The total axial force which acts towards the right on the lever spring 15 is so calculated that, during operation of the clutch unit 1, an axial displacement or swiveling of the lever spring 16, resulting at least from resonance phenomena and/or axial vibration or wobble oscillation of at least individual components of the clutch unit, is prevented. Further energy stores or spring elements which act on the pressure plate 9 or directly on the lever spring 15 may optionally be provided in addition to the lever spring elements.

The adjustment device 29 further includes a sensor device 30 which is arranged radially inside and, in this case, at a distance from the adjusting ring 28. The sensor device 30 includes a sensor ring 31 which, similarly to the sensor ring 24, is rotatable with respect to the housing-like component 12 and is supported via a ramp system. The sensor device 30 also includes a sensor element 32 which is carried either indirectly or directly by the housing-like component 12. The sensor element 32 has at least one, and preferably a plurality of, stop regions 33 distributed around the circumference, which cooperate with counter-stop regions 34 at least if wear occurs on the friction linings 6 of the clutch disk 4. The counter-stop regions 34 may be formed by elements which are connected to the lever spring 15. It is especially advantageous if these counter-stop regions 34 are formed by tabs configured integrally with the lever spring 15. The sensor element 32 has regions 35 which cooperate under axial pretension with regions 36 of the sensor ring 31. By means of the axial pretensioning of at least the regions 35, the sensor ring 31 is clamped axially, so that rotation thereof is prevented at least if wear on the friction linings 6 is absent. Uncontrolled adjustment of the adjustment device 29 which is not caused by wear is thereby avoided.

The sensor element 32 may likewise be formed by an annular component which is configured similarly to the sensor element 25 and is connected to the housing-like component 12 and is effective in a manner similar to that described in connection with the sensor element 25.

The axial distance (38 in FIG. 2) between the stop regions 33 and the counter-stop regions 34 visible in FIG. 1 is so dimensioned that, with the friction clutch 2 fully closed and with no wear present on the friction linings 6, only a touching or light abutment between these regions 33 and 34 takes place, ensuring that the sensor ring 31 remains blocked against rotation. The closing of the friction clutch 2 takes place in a manner similar to that described in connection with the friction clutch 3. A closing force is applied in the region of the tips 37 of the lever spring 15 by means of an actuating device. This closing force is built up gradually, namely until the axial force exerted on the pressure plate 9 is sufficient to transmit the torque delivered by the engine via the clutch disk 4 to the transmission. The maximum pressure force here may have at least a constant value. However, it may also be advantageous to adapt this closing force appropriately as a function of the operating state of the engine and the torque actually delivered. This means that, if the engine is delivering only 50% of its nominal torque, the pressure force can be correspondingly reduced.

A similar actuation is also possible for the friction clutch 3.

Figure 2:
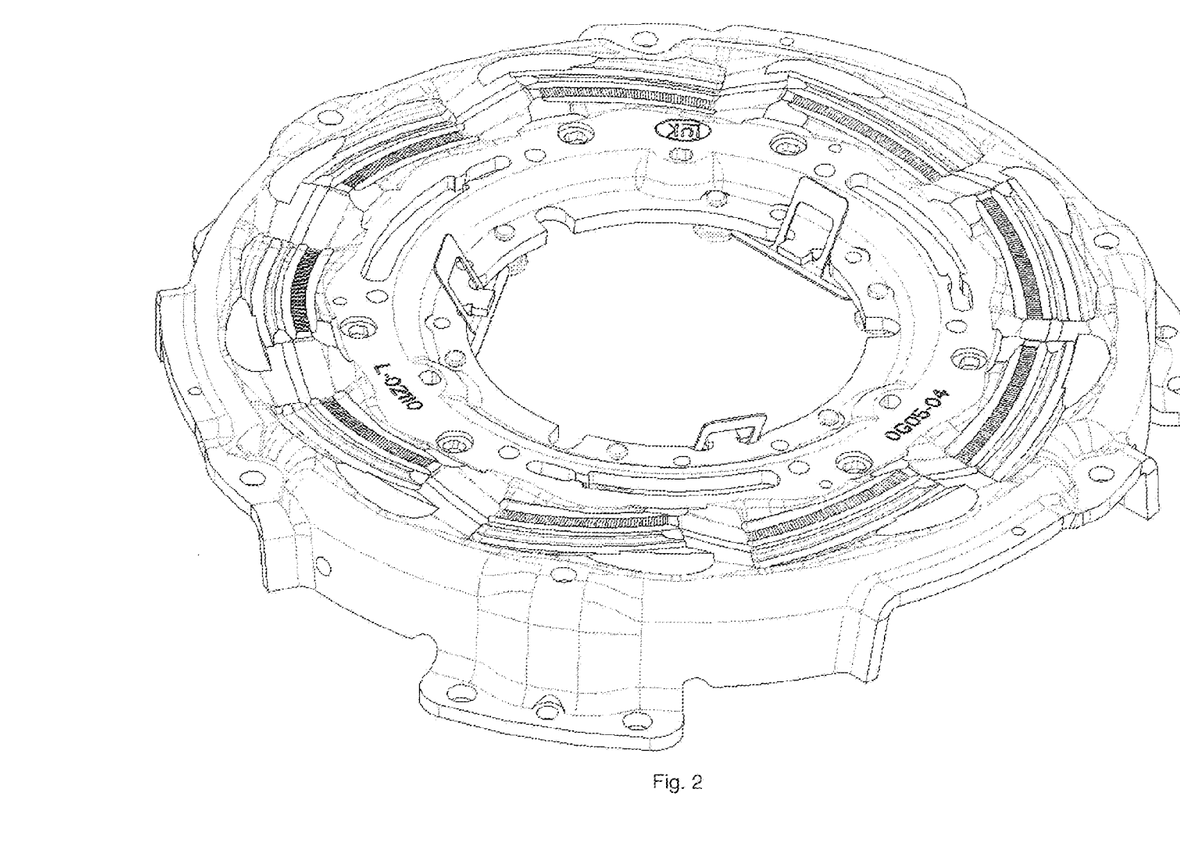

The adjustment device 29 of the friction clutch 2, which is arranged axially between the housing-like component 12 and the lever spring 15, is represented in FIG. 2, the lever spring 15 occupying an actuation position or swiveled position which corresponds to the disengaged state of the friction clutch 2. In this FIG. 2 the aforementioned play between the stop regions 33 and the counter-stop regions 34 is denoted by reference character 38. In this actuation position of the friction clutch 2 both the adjusting ring 28 and the sensor ring 31 are secured against rotation.

Figure 3:
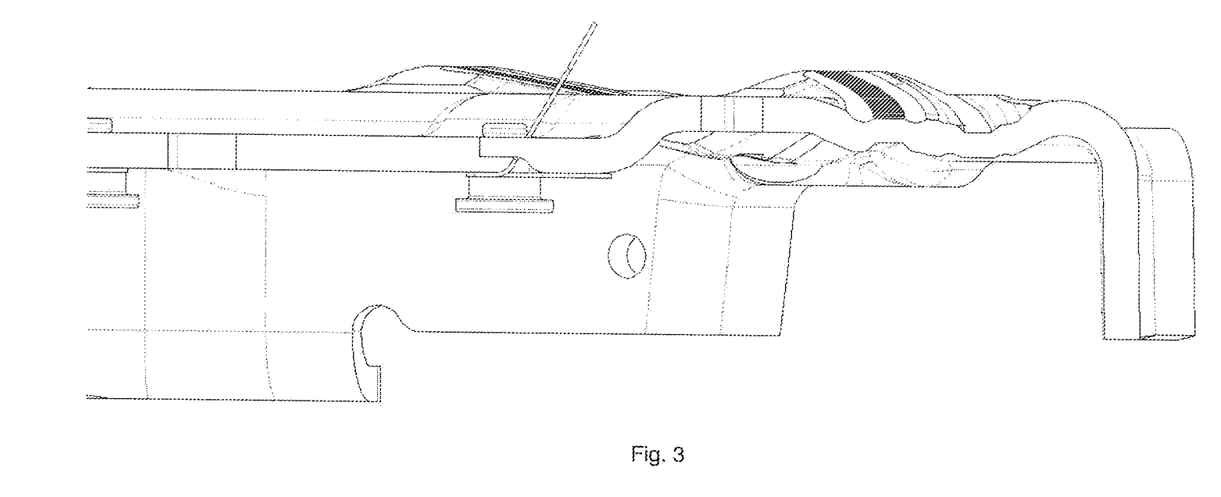

In FIG. 3 the friction clutch 2 is in an actuation position which corresponds to a fully engaged or closed state of the friction clutch 2 and in which no wear, or no increase in wear, has occurred on the friction linings of the corresponding clutch disk 4. It can be seen that the lever spring 15 has been swiveled about the rolling region 39 of the adjusting ring 28 to an angular position in which touching or abutment between the stop regions 33 and the counter-stop regions 34 just takes place, so that the sensor element 32 is not loaded or deformed axially and the sensor ring 31 therefore remains secured against rotation. It can be seen that the axial play 38 present in FIG. 2 is not present in FIG. 3.

If no wear, or no increase in wear, has occurred, the individual components resume their position shown in FIG. 2, or retain their corresponding position, as the friction clutch 2 is opened again.

If wear occurs at least on the friction linings of the clutch disk 4 associated with the friction clutch 2, the swiveling travel or swivel angle of the lever spring 15 about the rolling region 39 which is required for complete closing of this friction clutch 2 increases. This increase depends on the magnitude of the wear which has occurred. At the same time, the increase in closing travel in the region of the tips 37 causes the counter-stop regions 34 also to undergo a wear-dependent increase of their axial displacement travel. This increase of the displacement travel of the counter-stop regions 34 causes the stop regions 33 carried by the sensor element 32 also to be displaced correspondingly, as a result of which the sensor ring 31 is unloaded axially. This unloading causes an axial play to tend to be produced between the cooperating regions 35 and 36 of the sensor element 32 or of the sensor ring 31. Actually, however, this play is not produced, as the sensor ring 31 is transported onwards in the circumferential direction or the adjustment direction by at least one spring element and, as a result of the ramp system present between the sensor ring 31 and the housing-like component 12, is displaced in the axial direction in such a manner that the regions 36 of the sensor ring 31 follow the axial displacement of the regions 35 of the sensor element 32. At least a partial compensation of at least the wear which has occurred on the friction linings of the corresponding clutch disk 4 is thereby caused.

Figure 4:
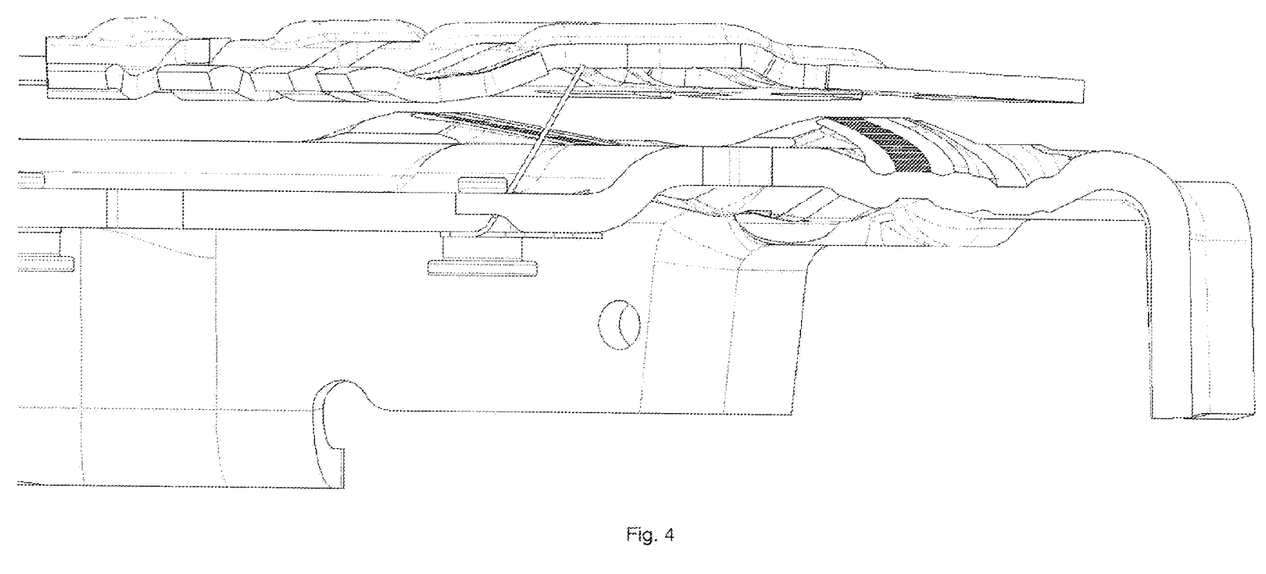

In order to open the friction clutch 2 from the closed position shown in FIG. 4, the tips 37 of the lever spring 15 are unloaded so that, as a result of the axial force applied to it at least via the pressure plate 9, and/or as a result of its own spring properties, the lever spring 15 moves back to an angular position in which the same play 38 as in FIG. 2 is at least approximately present between the stop regions 33 and the counter-stop regions 34. Because of the adjustment of the sensor ring 31 which has taken place and because of the axial support or swiveling of the lever spring 15 in the region of the sensor ring 31 taking place as the friction clutch 2 is opened, the adjusting ring 28 is also unloaded so that it can rotate and, because of the ramp system provided between it and the housing-like component 12, can be displaced axially with respect to the housing-like component 12. This axial displacement has the result that the adjusting ring 28 always remains in abutment against the regions 15a of the lever spring 15 which then tend to swivel away. After the adjusting ring 28 has been adjusted, the wear adjustment cycle is complete.

If the friction clutch 2 is now actuated to the engaged position, the lever spring 15 adopts a position corresponding substantially to that in FIG. 3, which means that the stop regions 33 and the counter-stop regions 34 just touch, but that overall the lever spring 15, in accordance with the axial adjustment of the adjusting ring 28, has been slightly displaced with respect to the housing-like component 12.

In addition, because of the kinematics of the total system, a slight change of the conical disposition of the lever spring 15 may occur.

It can be seen from the figures that the magnitude of the adjustment as a function of wear is dependent on the radial distance between the support or rolling region 39 of the adjusting ring 28 and 40 (FIGS. 2 and 3) of the sensor ring 31, or on the radial distance between this rolling region 39 of the adjusting ring 38 and the contact regions between the stop regions 33 and the counter-stop regions 34. For example, by means of an increase of the corresponding distance, a wear-compensation can be achieved which is greater than the axial wear which has actually occurred. By means of a reduction of this distance a wear-adjustment can take place which is smaller, for example, than the wear which has actually taken place on the friction linings. If desired, a change in the conicity of the lever spring 15, at least in the closed state of the friction clutch and possibly also in the open state of this friction clutch, can thereby be achieved together with a change in the necessary actuation travel in the region of the tips 22 and/or 37.

Because, in the exemplary embodiment illustrated, the support diameter between the sensor ring 31 and the lever spring 15 is at least substantially identical to the support diameter between the lever spring 15 and the pressure plate 9, an axial adjustment of the lever spring 15 takes place here which corresponds substantially to the actual wear which has occurred.

Figure 5:
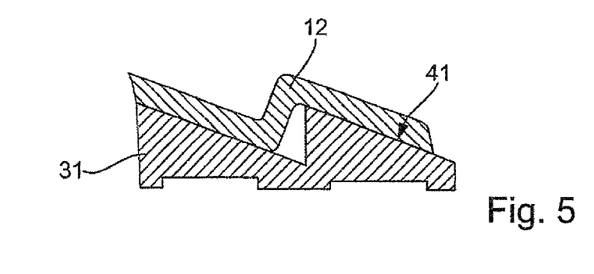

FIG. 5 shows schematically a ramp system 41 between the housing-like component 12 and the sensor ring 31. The ramp system between the sensor ring 31 and this housing-like part 12 may be configured similarly. With regard to the dimensioning of the actual ramp angle of the ramp system 41, reference is made to the aforementioned prior art.

As already mentioned, it must be constantly assured by means of the normal actuation travel of the friction clutches 2, 3 that the corresponding lever spring 15, 16 remains resiliently in contact with the associated adjusting ring 28, 20 in order to prevent it from lifting away from this adjusting ring 28, 20, since otherwise an uncontrolled adjustment not caused by wear would take place. The aforementioned resilient contact may be effected, as already mentioned, by means of the leaf spring elements acting axially on the pressure plates 9, 10, which leaf spring elements at the same time ensure the transmission of torque. However, different or additional spring elements may be provided which indirectly or directly exert a corresponding axial force on the lever springs 15, 16.

However, it may also be advantageous if the reciprocally associated adjusting rings and sensor rings, that is 20, 24 for the friction clutch 3 and 28, 31 for the friction clutch 2, are effectively coupled to one another in such a way that the corresponding adjusting rings 20, 28 can execute only a rotation or an axial movement which is directly dependent on a rotation or an axial movement of the sensor rings 24, 31. For this purpose stops may be provided between the reciprocally associated rings, that is 20, 24 and 28, 31, for example rotary stops or axial stops, which ensure that the adjustment movements of the sensor rings 24, 31 determine the wear-compensating movements of the adjusting rings 21, 29. Suggestions for such design configurations can be derived from DE 43 42 390 A1 and DE 195 10 905 A1, in particular from FIGS. 5 to 8 thereof. Such a coupling makes it possible to provide the reciprocally associated adjusting rings and sensor rings with ramp systems of different gradients. The reciprocally associated rings can thereby travel different axial distances although they are subjected to the same rotation for adjustment. The magnitude of the difference of these distances may also be influenced by suitable dimensioning of the radial distance between the reciprocally associated adjusting rings and sensor rings. This makes it possible to achieve a change in the installed angular position of the lever springs, as a function of the wear which occurs, over the service life of the friction clutch. For example, the corresponding overall adjustment system may be configured in such a manner that the tips 22, 37 of the lever springs 15, 16 retain a practically constant axial position in the fully engaged and/or in the fully disengaged state over the service life of the friction clutches 2, 3, although the radially outer regions of the lever springs 15, 16 undergo an axial displacement as a result of the wear which occurs.

Figure 6:
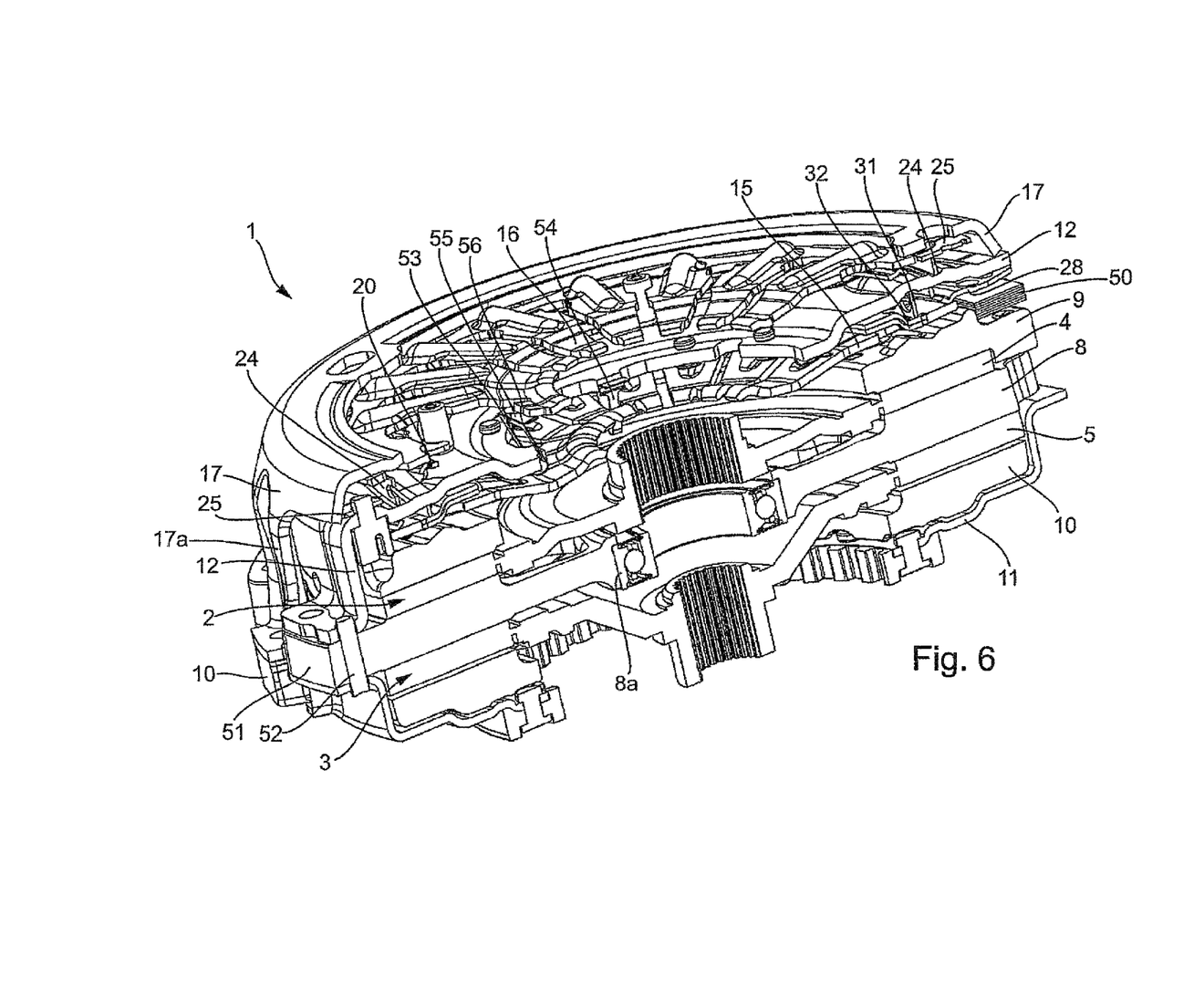

From the perspective representation shown in FIG. 6 of a clutch unit 1 according to the schematic representation of FIG. 1, the individual components can again be seen, namely the friction clutches 2, 3, the clutch disks 4, 5, the counter-pressure disk 8 arranged between the pressure plates 9, 10, the housing-like or cover-like drive plate 11, the housing-like component 12 which is rigidly connected axially to the counter-pressure disk 8, the cage-like or housing-like traction means 17 which is rigidly connected to the pressure plate 10, the disk-spring like lever springs 15, 16, the adjusting rings 20, 28, the sensor rings 24, 31, the sensor element 32 serving as a clamping spring for the sensor ring 31, the sensor element 25 serving as a clamping spring for the sensor ring 24 and the bearing 8a.

FIG. 6 also shows a tangentially arranged leaf spring pack 50, one circumferential end of which is rigidly connected to the pressure plate 9 and the other circumferential end of which is rigidly connected to the housing-like component 12. The leaf spring pack 50 is pretensioned axially in such a manner that, as already mentioned, the pressure plate 9 is loaded against the lever spring 15, so that the support ring 28 is clamped between the lever spring 15 and the housing-like component 12. Three such leaf spring packs 50, uniformly distributed over the circumference, are preferably provided.

Also visible in FIG. 6 is a connecting point 51 in the region of which the drive plate 11, the counter-pressure disk 8 and the housing-like component 12 are rigidly connected to one another. A positioning pin 52 can be seen in the region of the connecting point 51.

It can also be seen from FIG. 6 that the housing-like traction means 17 has axial feet or brackets 17a via which it is rigidly connected to the pressure plate 10.

It can also be seen from FIG. 6 that at least the pressure plates 9, 10 and the counter-pressure disk 8 have on their circumference radial extensions which are offset to one another circumferentially and serve to establish the required axial connections to the components associated with them.

In order to ensure that no unintended adjustment, at least inside the adjustment devices 21 and 29, occur during transportation of the clutch unit from the manufacturer to the operation of assembly to the engine at the vehicle producer's plant, transport safety devices 53, 54 are provided which are shown in an unlocked position in FIG. 6. The unlocked position should be understood to mean the position which the transport safety devices 53, 54 adopt after the clutch unit 1 has been assembled to the output shaft of an internal combustion engine or a motor and after a first actuation has taken place, preferably after at least engine and transmission have been connected. Although it may be useful also to unlock such transport safety devices using manual means, it is especially advantageous if the transport safety devices ensure the unlocking automatically. This can be effected, for example, on the basis of intrinsic elasticities. Thus, during assembly of the clutch unit 1 the transport safety devices 53, 54 are installed in a tensioned position so that an unloading of the transport safety devices 53, 54 can be effected by actuation of the corresponding friction clutch. The transport safety means can then relax elastically and thereby release the initially blocked adjustment devices 21 and 29.

It can be seen from FIG. 6 that the transport safety means 53 for the friction clutch 3, for example, are formed by spring bows carried by the housing-like component 12, which spring bows have a frame-like region 55. This frame-like region 55 can be swiveled radially inwards over the support elements 56 provided on the levers of the lever spring 16. The support elements 56 can thereby bear axially against the transport safety means 53 with a pretension, whereby the lever spring 16 can be held for transportation in a defined axially tensioned state which ensures that, in particular, the different rings 20 and 24 of the adjustment device 21 remain axially tensioned and therefore cannot cause any undesired adjustment. Upon first actuation of the friction clutch 3 the lever spring 16 is swiveled in such a manner that the tabs 56 unload the frame-like region 55, whereby this frame-like region 55 can spring back radially outwards and adopt the state shown in FIG. 6. The transport safety means 54 act according to the same or a similar principle with respect to the friction clutch 2 or the adjustment device 29.

Figure 7:
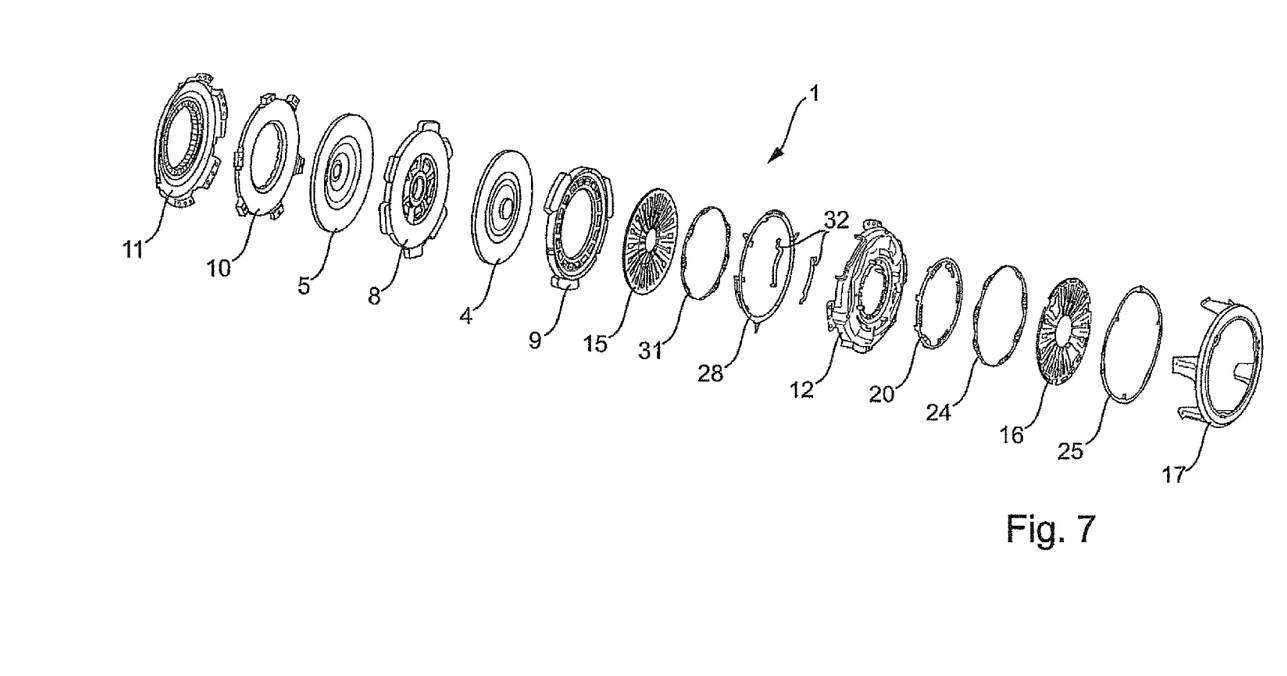

The essential features of the configuration of the main components of such a clutch unit are apparent from the exploded drawing of the clutch unit 1 shown in FIG. 7. The corresponding components are denoted by the reference characters of the preceding description.

LIST OF REFERENCE CHARACTERS

1 Clutch unit
2 Friction clutch
3 Friction clutch
4 Clutch disk
5 Clutch disk
6 Friction lining
7 Friction lining
8 Counter-pressure disk
9 Pressure plate
10 Pressure plate
11 Drive cage
12 Mounting
13 Lever element
14 Lever element
15 Lever spring
16 Lever spring
17 Traction means
18 End oriented away
19 Rolling support
20 Annular support ring
21 Adjustment device
22 Radially inner tips
23 Sensor device
24 Sensor ring
25 Sensor element
26 Stop regions
27 Counter-stop regions
28 Adjusting ring
29 Adjustment device
30 Sensor device
31 Sensor ring
32 Sensor element
33 Stop regions
34 Counter-stop regions
35 Regions
36 Regions
37 Tips
38 Axial play
39 Rolling region
40 Adjusting ring
41 Ramp system

The invention claimed is:

1. A clutch unit, comprising:
a first friction clutch having a first adjustment device with a first adjusting ring and a first sensor device, where the first sensor device determines wear occurring and has a first rotatable sensor ring with a first ramp system and a first sensor element with a first stop region;
a second friction clutch having a second adjustment device with a second adjusting ring and a second sensor device, where the second sensor device determines wear occurring and has a second rotatable sensor ring with a second ramp system and a second sensor element with a second stop region, the first stop region of the first friction clutch being arranged radially outside of the second adjusting ring and the second stop region of the second friction clutch being arranged radially inside of the first adjusting ring;
a housing at least partially surrounding the first friction clutch and the second friction clutch, the first rotatable adjusting ring being supported on the housing via the first ramp system and the second first rotatable adjusting ring being supported on the housing via the second ramp system;
the first friction clutch having a first pressure plate connected to the housing non-rotatably, but with limited axial displaceability;
the second friction clutch having a second pressure plate connected to the housing non-rotatably, but with limited axial displaceability;
a counter-pressure disk, which is connected to the housing, arranged between the first friction clutch and the second friction clutch;
the first friction clutch having a first clutch disk, which can be clamped between the first pressure plate and the counter-pressure disk, having friction linings, the first adjusting ring being rotatable to compensate for wear occurring at least on the friction linings of the first clutch disk;
the second friction clutch having a second clutch disk, which can be clamped between the second pressure plate and the counter-pressure disk, having friction linings, the second adjusting ring being rotatable to compensate for wear occurring at least on the friction linings of the second clutch disk;

lever elements, which are annularly arranged and have radially inner lever tips, respectively disposed operationally between the housing and the first and second pressure plates, the housing being connected to the counter-pressure disk and the lever elements; and a rolling support carried by one of the first adjusting ring and the second adjusting ring, one of the lever elements being supported swivelably on the rolling support, wherein the lever elements are loaded at the radially inner lever tips so as to close the first friction clutch and the second friction clutch, and the lever elements are loaded axially, wherein the first sensor device is provided axially between the housing and one of the lever elements associated with the first clutch and the second sensor device is provided axially between the housing and one of the lever elements associated with the second clutch, wherein the first sensor element blocks the first sensor ring if wear is absent and has regions which ensure a clamping and a limitation of rotation of the first sensor ring and the first sensor ring is displaceable, upon closing of the first friction clutch, as a function of wear which occurred in order to make possible a wear-dependent adjustment of the first sensor ring, whereby in turn an axial displacement of the first adjusting ring as a function of the wear which has occurred is ensured upon opening of the first friction clutch, and wherein the second sensor element blocks the second sensor ring if wear is absent and has regions which ensure a clamping and a limitation of rotation of the second sensor ring and the second sensor ring is displaceable, upon closing of the second friction clutch, as a function of wear which occurred in order to make possible a wear-dependent adjustment of the second sensor ring, whereby in turn an axial displacement of the second adjusting ring as a function of the wear which has occurred is ensured upon opening of the second friction clutch.

2. A clutch unit, comprising:

a housing component;

a counter-pressure disk connected to the housing component;

at least one friction clutch having at least one pressure plate connected to the housing component non-rotatably, but with limited axial displaceability, at least one clutch disk with friction linings, which can be clamped between the pressure plate and the counter-pressure disk, and lever elements, which are annularly arranged disposed between the housing component and pressure plate, having support regions;

a rolling support carried by the housing component, the lever element being supported swivelably on the rolling support;

an automatic adjustment device having a component and being arranged between the lever elements and the housing component or between the lever elements and the pressure plate, the automatic adjustment device affecting at least a partial adjustment of at least one of the friction linings of the clutch disk; and transport safety means, which are attached to the housing component, being formed by at least one elastic frame element extending axially and radially outwardly away from the friction clutch, the frame element having a radial through-hole, the transport safety means being installed in a pretensioned state during assembly of the clutch unit and cooperating with the support regions provided on the lever elements to pretension the lever elements to prevent unintended adjustment of the automatic adjustment device, and the transport safety means relaxing, at least partially, upon subsequent actuation of the friction clutch adopting a state in which cooperation of the frame element with the support regions of lever elements is cancelled, thereby releasing the automatic adjustment device.

3. The clutch unit as claimed in claim 2, wherein a force is applied to the lever elements on their radially inner lever tips in order to close the friction clutch.

4. The clutch unit as claimed in claim 2, wherein the lever elements form a disk spring component which is installed inside the friction clutch in such a manner that it tends to spring back in an opening direction of the friction clutch.

5. The clutch unit as claimed in claim 2, wherein the transport safety means automatically adopts a position which releases the adjusting function of the automatic adjustment device.

6. The clutch unit as claimed in claim 2, wherein the transport safety means has a base attaching the frame element to the housing component, a first leg extending from the base, a second leg spaced from the first leg and extending from the base in a same direction as the first leg and a third leg interdisposed between the first leg and the second leg so as to form a substantially inverted U-shaped structure extending from the base.

* * * * *